2,783,200

SLUDGE CONDITIONING AND DISPERSING AGENTS FOR BOILER WATER TREATMENT

Ferris B. Crum, Oak Park, and John F. Wilkes, La Grange, Ill., assignors to Dearborn Chemical Company, Chicago, Ill., a corporation of Illinois No Drawing. Application November 3, 1951, Serial No. 254,808

7 Claims. (Cl. 210—23)

The present invention relates to a method for sludge or precipitate conditioning in water softening, particularly in the treatment of boiler water, and to compositions adapted to be dispersed in water for such purposes.

In particular, our invention relates to a method for conditioning the sludge or precipitate normally formed during the treatment of boiler feed water, so as to impart thereto a desired degree of flocculence and fluidity and to render the sludge non-sticky and non-crystalline.

Proper conditioning of boiler water is of primary importance in the field of water treatment. In fact, the art of internal treatment of boiler water depends upon the obtaining of a fluid non-sticking boiler water sludge. Failure to obtain satisfactory conditioning of the boiler sludge will result in serious boiler trouble. The problem is not confined to any given type of boiler; it is common to all boilers.

Internal boiler water treatment, in contrast to external treatment, consists mainly in maintaining desirable concentrations of chemicals in the boiler water itself. The chemicals to be added and the concentrations thereof which are to be maintained in the boiler water vary with the nature of the feed water and the result of the operation. The usual agents for inhibiting scale formation are sodium carbonate, sodium phosphates and sodium aluminates.

The sodium phosphates are used principally to precipitate as tricalcium phosphate, calcium salts or "hardness" components entering with the feed water. Tricalcium phosphate is a generally finely divided material which has considerably less tendency to form objectionable deposits than have the calcium compounds that otherwise would be present in the boiler water. In some instances, a similar reaction may occur with the magnesium "hardness" components present in the feed water, but in practice sufficient alkalinity usually is present to precipitate magnesium as magnesium hydroxide.

Sodium carbonate is used chiefly to promote the desirable alkalinity in the boiler water and to inhibit the formation of calcium sulfate scale. It may also retard formation of silica scale.

In general, such chemicals are of a type classified as water-soluble, alkaline-reacting water softening agents, which function so as to impart suitable alkalinity to the boiler water and to effect the formation of a suitable precipitate or sludge in removing the principal "hardness" components of the normally hard boiler feed water. Such hardness components consist principally of calcium and magnesium salts.

In internal boiler water treatment processes, vegetable tannin extracts and gums, such as quebracho, chestnut extract, processed lignins, cutch and alginates have been employed for many years as sludge conditioning reagents. Such reagents are added to prevent the formation of crystalline precipitates and to improve the fluidity of sludge so that it can be removed by "blowdown" procedures. The continued shortage of such materials, however, has made their use less desirable from a commercial point of view. In addition, such materials are essentially extracts or derivatives from natural organic sources and, as such, their stability, purity and over-all composition are subject to deviations which affect appreciably their performance.

It is, therefore, an important object of the instant invention to provide a composition and a method for improved sludge conditioning.

It is another object of the instant invention to provide an improved composition and method for imparting the desired degree of flocculence to sludge in the internal treatment of boiler water.

It is a further object of the instant invention to provide an improved composition and method for imparting the desired degree of fluidity to sludge in internal boiler water treatment.

It is yet another object of the instant invention to provide an improved composition and method for reducing the tendency toward stickiness in the sludge in internal boiler water treatment.

It is yet a further object of the instant invention to provide an improved composition and method for reducing the tendency toward the formation of crystalline types of sludge in internal boiler water treatment.

It is still another object of the instant invention to provide an improved composition and method for effecting an acceleration in the settling properties of sludge in internal boiler water treatment.

It is still a further object of the instant invention to provide an improved composition and method for obtaining suitable coagulating performance characteristics of sludge in internal boiler water treatment.

Other objects, feature and advantages of the instant invention will become apparent to one skilled in the art from the following description of preferred embodiments of the invention.

The method of the instant invention comprises dispersing certain acrylic polymers in the water that is treated to effect sludge formation; and the composition of the invention comprises a certain acrylic polymer composition effective for accomplishing suitable sludge formation and conditioning when incorporated in the water.

The acrylic polymers employed in the instant invention are the water-soluble low molecular weight "acrylics" which include polyacrylic acid, polymethacrylic acid, and the alkali metal salts thereof, and mixtures and/or copolymers of such compounds. Such polyacrylic and polymethacrylic acids, and mixtures and/or copolymers thereof, may thus be defined as a water-soluble alkenecarboxylic acid polymer, the alkenecarboxylyl radical of such acid having not more than 4 carbon atoms and not more than 3 of such carbon atoms form a straight chain. The least number of carbon atoms possible in alkenecarboxylic acid is 3, since 2 must be employed to form the $>C=C<$ group of the alkene portion and must be employed in the $>C=O$ group of the carboxylic acid radical. Those 3 carbon atoms form a straight chain,

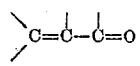

which is the maximum length provided for by the instant definition and an additional carbon atom, if present, in the molecule must be attached to the alpha carbon atom to form the structure:

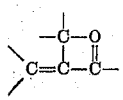

It can thus be seen that alkenecarboxylyl structures so defined are, as follows:

Acrylyl:

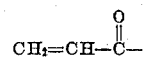

Methacrylyl:

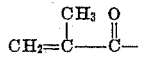

In the polymerization of compounds containing such polymerizably reactive alkenecarboxylyl radicals, the polymerization is an addition polymerization reaction involving the formation of a polymer chain structure whereby each of such acyl radicals is connected via the olefinic double bond therein, as represented in Equation 1 as follows:

(1) 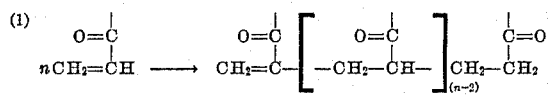

The "saturated" polymeric repeating chain units or the units comprising the polymeric chain structure are thus:

For acrylyl type:

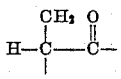

For both types:

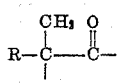

wherein R may be H or $CH_3$.

One method of preparing such alkenecarboxylic acid polymers involves the polymerization of methacrylonitrile and/or acrylonitrile ($CH_2=CR-C\equiv N$) and the subsequent hydrolysis of the polymer to convert the nitrile radicals to carboxylic acid radicals, as represented in connection with the chain units in Equation 2 below:

(2) 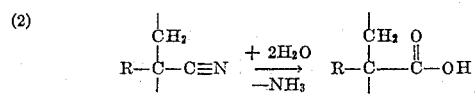

In the case of low polymers wherein the molecular size and complexity is not too great and wherein cross-linking through the nitrile groups has been substantially inhibited, the hydrolysis reaction may be substantially completely effected and the resulting chain structure consists almost entirely of the repeating carboxylic group-containing unit shown as the product in Equation 2.

The alkenecarboxylic acid polymer used in the instant invention may comprise such unmodified acid units in its polymer chain, or it may be additionally modified by a neutralization reaction involving replacement of the acid H with an alkali metal. Such neutralization may be only partial or it may be carried to substantial completion. (Theoretically complete neutralization, like theoretically complete hydrolysis according to Equation 2, is very probably an impossibility because of such factors as steric hindrance.) The neutralization reaction may be carried out by the use of any neutralizingly reactive alkali metal donor, preferably the hydroxide, as shown in Equation 3 below:

(3) 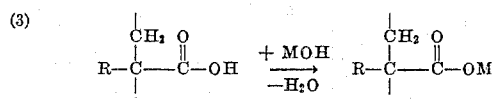

wherein M is an alkali metal atom.

The alkali metals are the monovalent metals of group 1A of the periodic system, which include sodium (Na) and potassium (K) as the principal members from an industrial point of view. The alkali metals also include lithium, rubidium and cesium, but only sodium and potassium are preferred for use in the instant invention and sodium is most preferred because of its availability and inexpensiveness.

Accordingly, the acrylic polymer preferably employed in the instant invention is one whose polymer chain structure comprises units having the following formula:

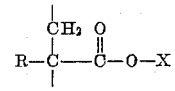

wherein R is H or $CH_3$ and X is H, Na or K. Needless to say, such structure contemplates the use therein of mixtures and/or copolymers of acrylyl and methacrylyl derived groups, as well as the partial or complete replacement of the acid H's by Na or K or any combination thereof. Also, such polymeric chain structure may be prepared by methods other than the method hereinbefore described, for example, by direct polymerization of sodium acrylate. In fact, it has been found that additional flexibility in the practice of the invention may be obtained by the use of acrylic-methacrylic acid polymers and alkali metal polyacrylate-polymethacrylate compositions because the presence or absence of the $CH_3$ group at the "R" position affects the hydrophilic-hydrophobic properties of the polymer molecule and these properties are of particlular importance in sludge conditioning.

It has been found that sodium polyacrylates and sodium polyacrylate-polymethacrylates are very effective in the practice of the invention, but that the polyacrylic acids presently available are more effective and may be used in smaller quantities. Also, the polyacrylic acids have viscosities such that they are more easily handled. On the other hand, it has been found that sodium polymethacrylates are uniquely superior even to the polyalkenecarboxylic acids for certain specific uses.

In general, a noticeable variation in the hydrophilic-hydrophobic properties may be obtained by the substitution of about 5–10 mol percent of a given polyacrylic acid with that amount of a polymethacrylic acid of substantially the same molecular weight, and vice versa.

The polyacrylic and polymethacrylic acids, and the alkali metal polyacrylates and polymethacrylates, and mixtures thereof, which may be used in the instant invention are essentially low polymers, which are water-soluble. It is, of course, well known that acrylic compounds may be polymerized to yield high molecular weight or "high" polymers which are solid resinous bodies that may or may not be solvent-soluble, but which are water-insoluble. As the molecular weight of such polymers increases the water solubility decreases until, at a given high molecular weight, the polymer is substantially completely water-insoluble. The instant invention contemplates the use of low molecular weight polymers which may be defined as the "water-soluble" polymers.

Another method of indicating polymer molecular weight involves the uses of the viscosity of the polymer, preferably in some standard solution. Two well known devices for measuring viscosity of polymer solutions are the Brookfield viscometer and the Ostwald pipette. Brookfield viscosities are specified in centipoises, whereas Ostwald pipette viscosities are specified in centistokes. The following viscosity specifications are available for commercial compounds suitable for use in the invention:

*Compound A*—is a relatively pure polyacrylic acid produced synthetically from acrylic acid, available under the name "Acrysol A–1" (Rohm and Haas) in 25 weight percent solids aqueous solution; a 5% solids aqueous solution having an Ostwald pipette viscosity of 10 centistokes.

*Compound B*—is a relatively pure polyacrylic acid produced synthetically from acrylic acid available under the name "Acrysol A–1–LV" (Rohm and Haas) in 25% solids aqueous solution, a 5% solids aqueous solution having an Ostwald pipette viscosity of 4 centistokes.

*Compound C*—is a relatively pure polyacrylic acid produced synthetically from acrylic acid, available under the name "Acrysol A-1-XLV" (Rohm and Haas) in 25% solids aqueous solution, a 5% solids aqueous solution having an Ostwald pipette viscosity of 2 centistokes.

Compound D—is a sodium salt of a polyacrylic acid made by hydrolysis of polyacrylonitrile, available under the name "Acrysol-GS-NEW" (Rohm and Haas) in 12½ percent solids aqueous solution, such solution having a Brookfield viscosity of 13,000 centipoises and a 5% solids aqueous solution has a Brookfield viscosity of 1050 centipoises or an Ostwald pipette viscosity of 586 centistokes.

Compound E—is a sodium salt of polymethacrylic acid, available under the name "Acrysol G-4694" (Rohm and Haas) in 40% solids aqueous solution, a 5% solids aqueous solution having substantially the same viscosity as that of compound D.

The foregoing compounds are infinitely dilutable in hot or cold water. Such compounds are, however, coagulated by acids and also by certain salts of polyvalent metals. This latter property might have indicated that such compounds could not function reliably in the presence of the polyvalent calcium and magnesium salts in hard water, but it has been found that such is not the case. Although there may be some reactions of such character taking place with the polyvalent ions present in the practice of the invention, it appears that these reactions effect an advantageous result, if anything.

If compound A, B or C is converted to an alkali metal salt thereof, for example, by reaction of sodium hydroxide therewith, then Ostwald pipette viscosity of a 5% aqueous solution thereof is increased by a factor of approximately 6. Thus, a 5% aqueous solution of the sodium salt of the polyacrylic acid of compound A has an Ostwald pipette viscosity of about 60 centistokes.

It has been found that the acrylic polymers suitable for use in the instant invention may be water-soluble polymers of such molecular weight that 12½ aqueous solutions thereof have a Brookfield viscosity ranging from about 5000 to about 50,000 centipoises, and preferably about 10,000 to 20,000 centipoises in the case of the polymer salts in particular.

Optimum results have been obtained using the polyacrylic acids of compounds A, B and C, whose 5% aqueous solutions have Ostwald pipette viscosities ranging from about 2 to about 10 centistokes. On the other hand, operative acrylic polymers (acids and/or salts) of the invention include those whose 5% aqueous solutions have Ostwald pipette viscosities ranging from about 1 to about 1000 centistokes, and preferably about 1 to about 100 centistokes.

The water-soluble alkaline-reacting water softening agent which is employed with the acrylic polymer in the instant invention is a well known type of water softening agent which functions in hard water so as to effectively precipitate calcium and magnesium salts from the water and to impart moderate alkalinity to the water. It must be water-soluble so that it is able to incorporate in the water anions, such as the phosphate anion, which are capable of forming insoluble calcium and magnesium salts. It must be alkaline-reacting not only to insure the formation of suitable insoluble calcium and magnesium salts, such as phosphates, carbonates and hydroxides, but also to prevent acid-caused coagulation of the acrylic polymer. The agent thus cooperates with polymer so as to insure its stability in dry or liquid packaged form prior to use as well as in the boiler feed water during use. In addition, the agent functions in the hard water to selectively react with and remove polyvalent calcium and magnesium cations in the form of insoluble salts which are inert with respect to the coagulation of the polymer.

The preferred water softening agent used in the practice of the invention is an alkali metal phosphate and/or carbonate. Again, the alkali metal salts contemplated are sodium and potassium, sodium salts being most preferred. The phosphates which may be used are those which are customarily used in boiler water treatment—namely:

Trisodium phosphate, $Na_3PO_4$
Disodium phosphate, $Na_2HPO_4$
Monosodium phosphate, $NaH_2PO_4$, and
Sodium metaphosphate, $(NaPO_3)_x$ As used herein the term "sodium phosphate" means any one of such phosphates or mixtures thereof, all of which are well known as water softening agents.

In the preparation of a suitable boiler compound, for example, the polymer and the agent should be combined in a weight ratio ranging from a minimum of about 1:500, at which the least effective amount of polymer is combined with the agent so that an appreciable sludge conditioning effect is obtained by the use of normal amounts of the agent to accomplish softening of relatively hard water, to about 1:5, at which the maximum amount of polymer that may be economically used is combined with the agent to effect softening of relatively soft feed water. Preferably, the weight ratio is kept at a minimum, not more than about 1:20, so that the amount of polymer present is not in excess of that necessary. On the other hand, if it is desired to add a minimum amount of agent to the polymer, the amount added must be at least sufficient to maintain an alkaline pH to insure stability.

The polymer and the agent may be admixed in aqueous solution, if desired, and the total solids content should be at least 25% so as to afford economic shipping of the boiler compound. On the other hand, another advantage of the instant invention resides in the fact that the polymers, particularly the salts, may be spray-dried and thereby packaged and shipped in dry form in combination with the agent.

Preferably, the softening agent consists of a mixture of two or more compounds, one of which is an alkali metal carbonate, such as sodium carbonate, and one or more of the others comprise the alkali metal phosphate component, for example, a mixture of disodium and monosodium phosphates. Although the agent may consist substantially entirely of a sodium phosphate usually sodium carbonate is combined therewith the phosphate-carbonate weight ratio ranging from about 5:1 to about 100:1.

In the practice of the invention the agent and polymer are added to the water in dosages expressed in p. p. m. (parts per million by weight) of the water treated. In effect, the agent is added to hard water to effect a sludge formation and under the usual conditions of temperature, etc., suitable for such sludge formation, and the polymer is added so as to cooperate with the agent in effectively obtaining a properly conditioned sludge. Accordingly, each is added in substantially the amount necessary for each to carry out its particular functions, the polymer being added as a sludge conditioner and the agent being added as a sludge creator in an amount at least sufficient to precipitate the hardness components in the water. In general, it has been found that the dosage of the agent necessary to accomplish that purpose in the case of the usual hard waters ranges from about 100 p. p. m. to about 300 p. p. m. The sodium phosphates are particularly effective when used in dosages within that range, and the preferred range for disodium phosphate is about 100 p. p. m. to about 200 p. p. m., the optimum being about 130 p. p. m.

As hereinbefore explained, in the internal treatment of boiler water there is necessarily sludge formation. The instant invention provides a method for effectively conditioning such sludge by the dispersion in the water, as a sludge conditioner, of an acrylic polymer. It has been found that the dosages at which such polymer most effectively carries out its sludge conditioning function range from about 0.3 p. p. m. to about 20 p. p. m. under ordinary sludge formation conditions, the preferred dosages ranging from about 0.3 p. p. m. to about 5 p. p. m., particularly for the polymers of compounds A, B and C. The optimum dosage is about 1 p. p. m. under average conditions.

The particular advantages of the instant invention are more fully demonstrated in the following examples showing preferred procedures.

Example 1 (blank run)

A total of eleven liters of Chicago water was pretreated with a specific dosage and then concentrated to a final volume of about 350 ml. by adding the pretreated water, 500 ml. at a time, to an autoclave which was heated and vented so as to maintain about 200 pounds per square inch (gauge) pressure in the autoclave until all of the water had been added to the autoclave and a residue of about 350 ml. remained therein, thereby effectively accomplishing about 30 concentrations of the water. The residue was then examined to ascertain the general character of the sludge therein.

The dosages used in each of the instant separate blank runs were:

(1a)

| | P. p. m. |
|---|---|
| Anhydrous disodium phosphate | 33 |
| Monosodium phosphate monohydrate | 81 |

(1b)

| | P. p. m. |
|---|---|
| Anhydrous disodium phosphate | 25 |
| Monosodium phosphate monohydrate | 83 |

Examination of the residue in each case revealed that the precipitate therein was finely divided, compact and sticky, and that the solution cleared slowly.

Example 2

A procedure was carried out that is the same as that described in Example 1 except that the dosage used was as follows:

| | P. p. m. |
|---|---|
| Anhydrous disodium phosphate | 20 |
| Monosodium phosphate monohydrate | 86 |
| Compound D | 5 |

Examination of the residue so obtained revealed that the sludge was noticeably better than that obtained in Example 1. The particles of precipitate were larger, more flocculent and less sticky.

Example 3

A procedure was carried out that is the same as that described in Example 1 except that the dosage used was as follows:

| | P. p. m. |
|---|---|
| Anhydrous disodium phosphate | 18 |
| Monosodium phosphate monohydrate | 88 |
| Compound D | 5 |

Examination of the residue so obtained revealed that it was substantially the same as the residue described in Example 2.

Example 4

A procedure was carried out that is the same as that described in Example 1 except that the dosage used was as follows:

| | P. p. m. |
|---|---|
| Anhydrous disodium phosphate | 18 |
| Monosodium phosphate monohydrate | 88 |
| Compound D | 10 |

Examination of the residue revealed that the precipitate was noticeably more flocculent than that obtained in Examples 2 and 3 and that it settled faster.

Example 5

A procedure was carried out that is the same as that described in Example 1 except that the dosage used was as follows:

| | P. p. m. |
|---|---|
| Anhydrous disodium phosphate | 16 |
| Monosodium phosphate monohydrate | 90 |
| Compound D | 7.5 |

Examination of the residue revealed a fluid, flocculent precipitate with no fines. The solution cleared completely in a few minutes. There was noticeable improvement in the sludge over that obtained in carrying out Examples 2 and 3.

Example 6

A procedure was carried out that is the same as that described in Example 1 except that the dosage used was as follows:

| | P. p. m. |
|---|---|
| Anydrous disodium phosphate | 16 |
| Monosodium phosphate monohydrate | 90 |
| Compound D | 7.5 |
| Maracell E (a modified lignin obtained in the processing of sulphite waste liquors from paper manufacture) | 3 |

Examination of the residue so obtained revealed that it was substantially the same as that in carrying out the procedure of Example 5.

Example 7 (blank run)

A procedure was carried out that is the same as that described in Example 1 except that the dosage used was as follows:

| | P. p. m. |
|---|---|
| Anhydrous disodium phosphate | 12 |
| Monosodium phosphate monohydrate | 92 |
| Sodium phytate | 20 |

Examination of the residue so obtained revealed a very fine, sticky precipitate. The solution required hours to clear completely.

Example 8

A charge of fifteen liters of pretreated Chicago water was pumped into a thirty liter-capacity boiler equipped with electrical heating elements. The charge was heated and the steam so obtained was vented so as to maintain a pressure of about 200 p. s. i. (gauge) in the boiler. The heating and venting were continued and additional pretreated water was continuously added to the boiler to maintain the fifteen liter level until about five concentrations of the water had been accomplished. Two liters of residue were then drawn off through a bottom draw-off cock of the boiler and several hours later the boiler water was tested for hardness and phosphate ion concentration.

The dosage used in pretreating the water was as follows:

| | P. p. m. |
|---|---|
| Anhydrous disodium phosphate | 130 |
| Soda ash | 20 |
| Compound D | 2.5 |

Examination of the residue revealed that the major portion of the precipitate settled rapidly, being finely fluocculent. The effect of the addition of compound D in the dosage was noticeable.

Analysis of the boiler water gave the following results:

| | |
|---|---|
| Hardness (as $CaCO_3$ in grains per gallon) | 0.2 |
| Phosphate ion concentration (in p. p. m.) | 28 |

Example 9

A procedure was carried out that is the same as that described in Example 8 except that the dosage used was as follows:

|  | P. p. m. |
|---|---|
| Anhydrous disodium phosphate | 117 |
| Compound D | 2.5 |

The procedure was continued until about five concentrations of the water had been accomplished.

Examination of the residue revealed that the precipitate was somewhat finer and more sticky than that obtained in the carrying out of the procedure of Example 8.

Analysis of the boiler water gave the following results:

| Hardness (as CaCO₃ in grains per gallon) | 0.1 |
|---|---|
| Phosphate ion concentration (in p. p. m.) | 75 |

Example 10

A procedure was carried out as the same as that described in Example 8 except that the dosage used was as follows:

|  | P. p. m. |
|---|---|
| Anhydrous disodium phosphate | 40 |
| Monosodium phosphate monohydrate | 67 |
| Compound D | 5 |

The procedure was continued until about twenty concentrations of the water had been accomplished.

Examination of the residue so obtained revealed a sludge that was an improvement over that obtained in carrying out the procedure of Example 8 in that the precipitate was more flocculent and more fluid.

Analysis of the boiler water gave the following results:

| Hardness (as CaCO₃ in grains per gallon) | 0.1 |
|---|---|
| Phosphate ion concentration (in p. p. m.) | 70 |

Example 11

A procedure was carried out that is the same as that described in Example 8 except that the dosage used was as follows:

|  | P. p. m. |
|---|---|
| Anhydrous disodium phosphate | 130 |
| Soda ash | 25 |
| Spray dried polymer of Compound D | 0.337 |

The procedure was continued until about five concentrations of water had been accomplished.

Examination of the residue so obtained revealed that the properties of the sludge were comparable to the properties of the sludge obtained by carrying out the procedure of Example 8.

Analysis of the boiler water gave the following results:

| Hardness (as CaCO₃ in grains per gallon) | 0.2 |
|---|---|
| Phosphate ion concentration (in p. p. m.) | 25 |

Example 12

A procedure was carried out that is the same as that described in Example 8 except that the dosage used was as follows:

|  | P. p. m. |
|---|---|
| Anhydrous disodium phosphate | 130 |
| Soda ash | 25 |
| Compound B | 1.25 |

The procedure was continued until about five concentrations of the water had been accomplished.

Examination of the residue so obtained revealed that the precipitate was loose, fluid and flocculent and the suspended matter settled very rapidly from the solution.

Example 13

A procedure was carried out that is the same as that described in Example 8 except that the dosage used was as follows:

|  | P. p. m. |
|---|---|
| Anhydrous disodium phosphate | 130 |
| Soda ash | 25 |
| Compound C | 1.25 |

The procedure was continued until about five concentrations of the water had been accomplished.

Examination of the residue so obtained revealed that the sludge had substantially the same properties as those obtained in carrying out the procedure of Example 12.

Analysis of the boiler water gave the following results:

| Hardness (as CaCO₃ in grains per gallon) | 0.2 |
|---|---|
| Phosphate ion concentration (in p. p. m.) | 15 |

Example 14 (blank run)

A procedure was carried out that was the same as carried out in Example 8 except that the dosage used was as follows:

|  | P. p. m. |
|---|---|
| Anhydrous disodium phosphate | 130 |
| Soda ash | 25 |

The procedure was continued until about five concentrations of the water had been accomplished.

Examination of the residue so obtained revealed that there was an extremely fine slow settling precipitate and there was no evidence of flocculation.

Analysis of the boiler water gave the following results:

| Hardness (as CaCO₃ in grains per gallon) | 0.1 |
|---|---|
| Phosphate ion concentration (in p. p. m.) | 9 |

Example 15

A procedure was carried out that is the same as that described in Example 8 except that the dosage used was as follows:

|  | P. p. m. |
|---|---|
| Anhydrous disodium phosphate | 132 |
| Soda ash | 25 |
| Compound A | 1.25 |

The procedure was continued until about five concentrations of the water had been accomplished.

Examination of the residue so obtained revealed that there was a fluid, flocculent precipitate, but the flocs were of medium size. All insoluble material in the form of flocs, precipitated quickly from the solution.

Example 16

A procedure was carried out that is the same as that described in Example 8 except that the dosage used was as follows:

|  | P. p. m. |
|---|---|
| Anhydrous disodium phosphate | 132 |
| Soda ash | 10 |
| Compound C | 1.25 |

The procedure was continued until about five concentrations of the water had been accomplished.

Examination of the residue so obtained revealed that the precipitate was loose, fluid and flocculent, much the same as the precipitate obtained in carrying out the procedure of Example 12, except that the precipitate was slightly finer and less voluminous.

Analysis of the boiler water gave the following results:

| Hardness (as CaCO₃ in grains per gallon) | 0.1 |
|---|---|
| Phosphate ion concentration (in p. p. m.) | 4 |

Example 17

A procedure was carried out that was substantially the same as that described in Example 8 except that the dosage used was as follows:

|  | P. p. m. |
|---|---|
| Anhydrous disodium phosphate | 135 |
| Soda ash | 10 |
| Compound C | 1.25 |

The procedure was continued until about five concentrations of the water had been accomplished.

Examination of the residue revealed that the sludge was substantially the same as that obtained in carrying out the procedure in Example 16.

Analysis of the boiler water gave the following results:

Hardness (as $CaCO_3$ in grains per gallon) _____ 0.2
Phosphate ion concentration (in p. p. m.) _____ 9

*Example 18*

A procedure was carried out that is the same as that described in Example 8 except that the dosage used was as follows:

|  | P. p. m. |
|---|---|
| Anhydrous disodium phosphate | 125 |
| Soda ash | 10 |
| Compound C | 0.625 |

The procedure was continued until about five concentrations of the water had been accomplished.

Examination of the residue so obtained revealed that the precipitate was similar to that obtained in the blank run described in Example 14, thereby indicating that a dosage of about 0.1562 p. p. m. on a dry basis of the polymer of compound C is insufficient under the instant circumstances to produce a noticeable improvement in sludge conditioning.

Analysis of the boiler water gave the following results:

Hardness (as $CaCO_3$ in grains per gallon) _____ 0.2
Phosphate ion concentration (in p. p. m.) _____ 7.5

*Example 19 (blank run)*

A procedure was carried out that was the same as that described in Example 8 except that the dosage used was as follows:

|  | P. p. m. |
|---|---|
| Anhydrous disodium phosphate | 135 |
| Soda ash | 10 |

The procedure was continued until about five concentrations of the water had been accomplished.

The residue so obtained was substantailly the same as that obtained in the blank run described in Example 14.

Analysis of the boiler water gave the following results:

Hardness (as $CaCO_3$ in grains per gallon) _____ 0.1
Phosphate ion concentration (in p. p. m.) _____ 8

*Example 20*

A procedure was carried out that is the same as that described in Example 8 except that the dosage used was as follows:

|  | P. p. m. |
|---|---|
| Anhydrous disodium phosphate | 139 |
| Compound B | 1.25 |

The procedure was continued until about five concentrations of water had been accomplished.

Examination of the residue so obtained revealed that the sludge had substantially the same properties as those obtained in carrying out the procedure of Example 16.

Analysis of the boiler water gave the following results:

Hardness (as $CaCO_3$ in grains per gallon) _____ 0.2
Phosphate ion concentration (in p. p. m.) _____ 12

*Example 21*

A procedure was carried out that is the same as that described in Example 8 except that the dosage used was as follows:

|  | P. p. m. |
|---|---|
| Anhydrous disodium phosphate | 145 |
| Compound A | 1.25 |

The procedure was continued until about five concentrations of the water had been accomplished.

Examination of the residue so obtained revealed that the sludge had substantially the same properties as those of the sludge obtained in carrying out the procedure of Example 15.

Analysis of the boiler water gave the following results:

Hardness (as $CaCO_3$ in grains per gallon) _____ 0.1
Phosphate ion concentration (in p. p. m.) _____ 35

*Example 22*

A procedure was carried out that is the same as that described in Example 8 except that the dosage used was as follows:

|  | P. p. m. |
|---|---|
| Anhydrous disodium phosphate | 35 |
| Disodium phosphate monohydrate | 80 |
| Compound A | 1.25 |

The procedure was continued until about ten concentrations of the water had been accomplished.

Examination of the residue revealed that the sludge so obtained had substantially the same properties as the sludge in carrying out the procedure of Example 21.

Analysis of the boiler water gave the following results:

Hardness (as $CaCO_3$ in grains per gallon) _____ 0.1
Phosphate ion concentration (in p. p. m.) _____ 55

*Example 23*

A procedure was carried out that is the same as that described in Example 8 except that the dosage used was as follows:

|  | P. p. m. |
|---|---|
| Anhydrous disodium phosphate | 260 |
| Soda ash | 40 |
| Compound D | 5 |

The procedure was continued until about 5 concentrations of the water had been accomplished and the water used was a synthetic hard water having the following approximate composition:

|  | Grains per gallon |
|---|---|
| $SiO_2$ | 0.60 |
| $Z_2O_3$ | 0.30 |
| $CaCO_3$ | 10.2 |
| $CaSO_4$ | 2.8 |
| $MgCO_3$ | 4.1 |

Wherein Z is a trivalent metal.

Examination of the residue so obtained revealed a fairly fluid, finely flocculent precipitate that was relatively slow in settling.

Analysis of the boiler water gave the following results:

Hardness (as $CaCO_3$ in grains per gallon) _____ 0.1
Phosphate ion concentration (in p. p. m.) _____ 80

*Example 24*

A procedure was carried out that is the same as that described in Example 23 except that the dosage used was as follows:

|  | P. p. m. |
|---|---|
| Anhydrous disodium phosphate | 250 |
| Compound D | 7.5 |

The procedure was continued until about ten concentrations of the water had been accomplished.

Examination of the residue so obtained revealed that there was a loose, fluid precipitate consisting of relatively large flocs, showing a distinct improvement over the sludge obtained in carrying out the procedure of Example 23.

Analysis of the boiler water gave the following results:

Hardness (as $CaCO_3$ in grains per gallon) _____ 0.2
Phosphate ion concentration (in p. p. m.) _____ 135

*Example 25 (Blank run)*

A procedure was carried out that is the same as described in Example 23 except that the dosage used was as follows:

|  | P. p. m. |
|---|---|
| Anhydrous disodium phosphate | 255 |

The procedure was continued until about five concentrations of the water had been accomplished.

Examination of the residue so obtained revealed a very fine, sticky, slow settling precipitate, there being no flocs visible in the residue.

Analysis of the boiler water gave the following results:

Hardness (as CaCO₃ in grains per gallon)_____ 0.1
Phosphate ion concentration (in p. p. m.)_____ 30

*Example 26*

A procedure was carried out that is the same as that described in Example 23 except that the dosage used was as follows:

P. p. m.
Anhydrous disodium phosphate_____255
Compound D_____2.5

The procedure was continued until about 5 concentrations of water had been accomplished.

The examination of the residue so obtained revealed that the precipitate was finely flocculent and fairly fluid, it being noticeably superior to the sludge obtained in carrying out the procedure of Example 25.

Analysis of the boiler water gave the following results:

Hardness (as CaCO₃ in grains per gallon)_____0.2
Phosphate ion concentration (in p. p. m.)_____33

*Example 27*

A procedure was carried out that is the same as that described in Example 23 except that the dosage used was as follows:

P. p. m.
Anhydrous disodium phosphate_____215
Monosodium phosphate monohydrate_____35
Compound C_____1.25

The procedure was continued until about five concentrations of the water had been accomplished.

Examination of the residue so obtained revealed that the precipitate was fluid, flocculent and very loose, it being noticeably superior to the sludge obtained by carrying out the procedure of Example 26.

Analysis of the boiler water gave the following results:

Hardness (as CaCO₃ in grains per gallon)_____0.1
Phosphate ion concentration (in p. p. m.)_____80

*Example 28*

A procedure was carried out that is the same as that disclosed in Example 23 except that the dosage used was as follows:

P. p. m.
Anhydrous disodium phosphate_____200
Monosodium phosphate monohydrate_____40
Compound B_____1.25

The procedure was continued until about five concentrations of water had been accomplished.

Examination of the residue so obtained revealed that the precipitate was substantially the same as that described in connection with Example 27.

*Example 29*

A procedure was carried out that is the same as that described in Example 8 except that the dosage used was as follows:

P. p. m.
Anhydrous disodium phosphate_____130
Soda ash_____20
Compound D_____5

The procedure was continued until about five concentrations of the water had been accomplished.

Examination of the residue so obtained revealed that the precipitate was loose, flocculent and the flocs were coarse and rather large particles.

If the same procedure is repeated except that the entire dosage of compound D that would normally be added during the entire run is added to the boiler at the start of the run, the resulting residue is substantially the same as that just described, thereby indicating that the polymer of compound D is substantially stable at the boiler temperature of 382° F. for the 6–7 hours consumed during the run.

If procedures are carried out that are the same as those just described except that compound E is used instead of compound D, the results obtained will be substantially the same as those just described.

Substantially the same results will also be obtained using equivalent quantities of sodium polyacrylate-polymethacrylate (copolymer) whose 12½% aqueous solution has a Brookfield viscosity of 10,000–20,000 centipoises.

Also, it has been found that a noticeable improvement in sludge conditioning may be obtained by carrying out the procedure just described using, instead of compound D, a sodium polyacrylate whose 12½% aqueous solution has a Brookfield viscosity of 50,000 centipoises (available under the name "Acrysol-GS").

If a procedure is carried out that is the same as that described in the instant example except that the dosage used was as follows:

P. p. m.
Anhydrous disodium phosphate_____145
Polymethacrylic acid—40% aqueous solution_____0.78 the precipitate in the residue is slightly flocculent and fluid, thereby evidencing a distinct improvement over the results obtained in the blank runs.

It will be understood that modifications and variations may be effected without departing from the scope of the novel concepts of the present invention.

We claim as our invention:

1. An internal boiler water treatment process that comprises dispersing into the boiler water, in amounts sufficient to maintain 0.3 to 20 p. p. m. concentration, a water-soluble acrylic polymer whose polymer chain structure comprises units having the following formula:

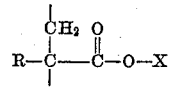

wherein R is of the class consisting of H and CH₃ and X is of the class consisting of H, Na and K, a 5 weight percent aqueous solution of such polymer having an Ostwald pipette viscosity of 1 to 1000 centistokes, and boiling said water in the boiler.

2. An internal boiler water treatment process that comprises dispersing into the boiler water, in amounts sufficient to maintain 0.3 to 20 p. p. m. concentration, an alkali metal polyalkenecarboxylate whose 12½ weight percent aqueous solution has a Brookfield viscosity of 5,000 to 50,000 centipoises, each of the alkenecarboxylyl radicals of such alkenecarboxylate having not more than 4 carbon atoms and not more than 3 of such atoms form a straight chain, and boiling said water in the boiler.

3. A method of treating boiler feed water that comprises dispersing therein from 0.3 to 20 p. p. m. of a water-soluble acrylic polymer whose polymer chain structure comprises units having the following formula:

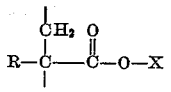

wherein R is of the class consisting of H and CH₃ and X is of the class consisting of H, Na and K, a 5 weight percent aqueous solution of such polymer having an Ostwald pipette viscosity of 1 to 100 centistokes, and from 100 to 300 p. p. m. of a sodium phosphate, and boiling said water in the boiler.

4. A method of treating boiler feed water that comprises dispersing therein 1 p. p. m. of sodium polyacrylate whose 12½ percent aqueous solution has a Brookfield viscosity of 10,000 to 20,000 centipoises, 20 p. p. m. of sodium carbonate and 130 p. p. m. of disodium phosphate, and boiling said water in the boiler.

5. In the treatment of hard water the steps of dispersing therein a conditioning composition and boiling the water to subject the water to boiler water operating conditions so as to effect rapid coagulation and settling of a flocculent, fluid, non-crystalline and non-sticky sludge precipitate, said conditioning composition comprising from 100 to 200 p. p. m. of disodium phosphate and from 0.3 to 5 p. p. m. of a polyacrylic acid whose 5 weight percent aqueous solution has an Ostwald pipette viscosity of 2 to 10 centistokes.

6. An internal boiler water treatment process that comprises dispersing into the boiler water, in amounts sufficient to maintain 0.3 to 20 p. p. m. concentration, a water-soluble acrylic polymer whose polymer chain structure comprises units having the following formula:

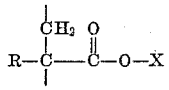

wherein R is of the class consisting of H and $CH_3$ and X is of the class consisting of H, Na and K, and boiling said water in the boiler.

7. A method of treating boiler feed water that comprises dispersing therein 0.3 to 5 p. p. m. of water-soluble sodium polyacrylate, and boiling the water.

References Cited in the file of this patent

UNITED STATES PATENTS

| | | |
|---|---|---|
| 1,247,833 | Heller | Nov. 27, 1917 |
| 2,097,649 | Solberg | Nov. 2, 1937 |
| 2,244,703 | Hubbuch | June 10, 1941 |
| 2,327,302 | Dittmar | Aug. 17, 1943 |
| 2,340,111 | D'Alelio | Jan. 25, 1944 |
| 2,455,961 | Walker | Dec. 14, 1948 |
| 2,552,775 | Fischer et al. | May 15, 1951 |

FOREIGN PATENTS

| | | |
|---|---|---|
| 22,361 | Great Britain | 1914 |
| 559,240 | Germany | Sept. 16, 1932 |
| 451,342 | Great Britain | July 27, 1936 |